(12) United States Patent
Fukushi

(10) Patent No.: US 7,291,369 B2
(45) Date of Patent: Nov. 6, 2007

(54) MULTI-LAYER ARTICLES INCLUDING A FLUOROELASTOMER LAYER AND A BARRIER LAYER AND METHOD OF MAKING THE SAME

(75) Inventor: Tatsuo Fukushi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/970,522

(22) Filed: Oct. 3, 2001

(65) Prior Publication Data

US 2003/0087053 A1     May 8, 2003

(51) Int. Cl.
*B32B 1/08* (2006.01)
*B32B 27/00* (2006.01)
*B32B 27/08* (2006.01)
*B65D 1/00* (2006.01)
*F16L 11/04* (2006.01)

(52) U.S. Cl. ........... 428/35.7; 428/34.1; 428/36.6; 428/36.7; 428/36.8; 428/36.9; 428/36.91; 428/421; 428/422; 428/500

(58) Field of Classification Search ........... 428/34.1, 428/35.7, 36.6, 36.7, 36.8, 36.9, 36.91, 421, 428/422, 500
See application file for complete search history.

(56) References Cited

U.S. PATENT DOCUMENTS

| | | | |
|---|---|---|---|
| 4,214,060 A | 7/1980 | Apotheker et al. | 525/387 |
| 4,287,322 A | 9/1981 | Worm | 525/403 |
| 4,338,237 A | 7/1982 | Sulzbach et al. | 524/777 |
| 4,745,165 A | 5/1988 | Arcella et al. | 526/247 |
| 5,209,958 A | 5/1993 | Katsaros et al. | 428/36.91 |
| 5,285,002 A | 2/1994 | Grootaert | 526/222 |
| 5,419,374 A | 5/1995 | Nawrot et al. | |
| 5,552,199 A | 9/1996 | Blong et al. | 428/36.9 |
| 5,658,671 A | 8/1997 | Fukushi | 428/421 |
| 5,679,425 A * | 10/1997 | Plumley | 428/35.7 |
| 5,759,329 A | 6/1998 | Krause et al. | 156/244.13 |
| 5,962,127 A * | 10/1999 | Maxson | 428/332 |
| 6,074,719 A * | 6/2000 | Fukushi et al. | 428/36.9 |
| 6,096,428 A * | 8/2000 | Jing et al. | 428/421 |
| 6,170,534 B1 | 1/2001 | Noone et al. | |
| 6,352,784 B1 * | 3/2002 | Katagiri | 428/511 |

FOREIGN PATENT DOCUMENTS

| | | |
|---|---|---|
| GB | 2 327 904 A | 2/1999 |
| JP | 02 035291 | 2/1990 |

(Continued)

OTHER PUBLICATIONS

F. W. Billmeyer, *Textbook of Polymer Science*, 3d ed. pp. 398-403, John Wiley & Sons, New York (1984).

(Continued)

*Primary Examiner*—Jennifer McNeil
*Assistant Examiner*—Walter B. Aughenbaugh
(74) *Attorney, Agent, or Firm*—Brian E. Szymanski

(57) ABSTRACT

A multi-layer article includes a first polymer layer bonded to a barrier layer, which is bonded to a second polymer layer. The first polymer layer can include a fluoroelastomer. The second polymer layer can be a non-fluorinated polymer layer. The barrier layer can include a polymer derived from vinyl acetate.

28 Claims, 1 Drawing Sheet

FOREIGN PATENT DOCUMENTS

| | | |
|---|---|---|
| JP | 05-318676 | 12/1993 |
| JP | 08-057870 | 3/1996 |
| JP | 11-325330 | 11/1999 |
| JP | 2000-018440 | 1/2000 |
| WO | WO96/09929 | 4/1996 |

OTHER PUBLICATIONS

R. A. Brullo, "Fluoroelastomer Rubber For Automotive Applications," *Automotive Elastomer & Design*, Jun. 1985.

R. A. Brullo, "Fluoroelastomer Seal Up Automotive Future," *Materials Engineering*, Oct. 1988.

W. M. Grootaert et al, "Fluorocarbon Elastomers", Kirk-Othmer, *Encyclopedia of Chemical Technology*, vol. 8, pp. 990-1005 (4th ed., John Wiley & Sons, 1993).

Tervoot et al, *Macromolecules*, vol. 33, pp. 6460-6465 (2000).

EVAL Barrier Resins for High Performance Applications, Eval Company of America, unknown year.

Fuel Permeation Performance of Polymeric Materials Analyzed by Gas Chromatography and Sorption Techniques, M. Nulman et al., Soc. Automotive Engineers, [Spec. Publ.] SP (1998), SP-1365.

Encyclopedia of Polymer Science and Engineering, vol. 2, pp. 188-189, (John Wiley & Sons, New York, 1985).

* cited by examiner

MULTI-LAYER ARTICLES INCLUDING A FLUOROELASTOMER LAYER AND A BARRIER LAYER AND METHOD OF MAKING THE SAME

TECHNICAL FIELD

This invention relates to a multi-layer article having a fluoroelastomer layer and a barrier layer, and a method of making the multi-layer article.

BACKGROUND

Fluorine-containing polymers (also known as "fluoropolymers") are a commercially useful class of materials. Fluoropolymers include, for example, crosslinked fluoroelastomers and semi-crystalline or glassy fluoroplastics. Fluoroplastics are generally of high thermal stability and are particularly useful at high temperatures. They can also exhibit extreme toughness and flexibility at very low temperatures. Many of these fluoroplastics are almost totally insoluble in a wide variety of solvents and are generally chemically resistant. Some have extremely low dielectric loss and high dielectric strength, and can have unique non-adhesive and low friction properties. See, e.g., F. W. Billmeyer, *Textbook of Polymer Science*, 3d ed., pp. 398-403, John Wiley & Sons, New York (1984).

Fluoroelastomers, particularly the copolymers of vinylidene fluoride with other ethylenically unsaturated halogenated monomers such as hexafluoropropylene, have particular utility in high temperature applications such as seals, gaskets, and linings. See, e.g., R. A. Brullo, "Fluoroelastomer Rubber for Automotive Applications," *Automotive Elastomer & Design*, June 1985; "Fluoroelastomer Seal Up Automotive Future," *Materials Engineering*, October 1988; and W. M. Grootaert et al., "Fluorocarbon Elastomers," Kirk-Othmer, *Encyclopedia of Chemical Technology*, vol. 8, pp. 990-1005 (4$^{th}$ ed., John Wiley & Sons, 1993).

In the automotive industry, increased concern with evaporative fuel standards has led to the need for fuel system components that have improved barrier properties. This helps reduce the permeation of fuel vapors through automotive elements such as fuel filler lines, fuel supply lines, fuel tanks, and other elements of an automobile fuel system. Multi-layer tubing and other articles containing a fluoropolymer layer have been used in such automotive elements to provide a chemically resistant permeation barrier.

Also, certain fuels may include additional components, such as oxygenating agents or other additives. Such multi-component fuels may react in a less than optimum way with individual component materials of an article, which can lead to incomplete permeation protection.

SUMMARY

In one aspect, a multi-layer article includes a first polymer layer, a barrier layer bonded to a surface of the first polymer layer, and a second polymer layer bonded to the barrier layer. The first polymer layer includes a fluoroelastomer. The second polymer includes a non-fluorinated polymer.

In another aspect, a process for preparing a multi-layer article includes providing a first polymer layer, providing a barrier layer on a surface of the first polymer layer, providing a second polymer layer on a surface of the barrier layer, and heating the first polymer layer, the barrier layer and the second polymer layer.

The fluoroelastomer can include interpolymerized units derived from vinylidene fluoride, tetrafluoroethylene or, optionally, hexafluoropropylene or chlorotrifluoroethylene. In certain embodiments, the fluoroelastomer can further include interpolymerized units derived from a vinyl ether monomer, such as perfluorinated alkoxy vinyl ether monomers, perfluorinated alkyl vinyl ether monomers, and combinations thereof.

The barrier layer is a layer that includes a material that has a permeation constant for a fluid in contact with the article that is lower than the permeation constant for the material contained in the other layers of the multi-layer article. The barrier layer can include a polymer derived from vinyl acetate, such as an ethylene vinyl alcohol copolymer. Vinyl alcohol containing polymers, such as ethylene-vinyl alcohol copolymer (EVOH) can provide multi-layer articles having improved gas barrier properties and excellent transparency compared to multi-layer articles that do not contain a vinyl-alcohol containing barrier layer. Excellent interlayer adhesion between the barrier layer and the fluoroelastomer layer can be obtained. The effective permeation constant of the multi-layer article including the barrier layer can be reduced in comparison with an article that does not include the barrier layer. The article including a fluoroelastomer bonded to a barrier layer can exhibit useful properties such as good fuel permeation resistance when the article contacts a petroleum fuel.

In some circumstances, the fluoroelastomer layer may act as a protective layer by isolating the barrier from liquids or vapors that may interact with the material of the barrier layer. In these cases, the combination of the protection of the fluroelastomer and the low fuel permeation of the barrier layer, e.g., EVOH, provides improved permeation behavior than either material alone or the same materials in the reverse order (with the EVOH, for example, contacting the fuel directly). This is because certain fuel additives, such as alcohols, may cause an EVOH-containing barrier layer to swell, for example, if put in direct contact with the barrier material.

The non-fluorinated polymer can include an elastomer or a thermoplastic elastomer, a thermoplastic polymer, or a thermoplastic elastomer. For example, the non-fluorinated polymer can include a nitrile rubber, an ethylene-propylene-diene terpolymer rubber, an epichlorohydrin rubber, an ethylene-acrylate copolymer rubber, a thermoplastic elastomer made from an ethylene-propylene-diene terpolymer and a polypropylene, a polyamide, a polyurethane, a polyolefin, or combinations thereof.

The second polymer layer can include an adhesion promoter, such as a functionalized polyolefin, for example, maleinized polyolefin. Improved interlayer adhesion between the barrier layer and the non-fluoroelastomer can be obtained when an adhesion promoter is included in the second polymer layer.

The adhesion is measured by determining the peel strength between layers in accordance with ASTM D 1876 (T-peel test). The peel strength between the first polymer layer and the barrier layer can be at least 1 N/cm, or 5 N/cm. The peel strength between the barrier layer and the second polymer layer can be at least 10 N/cm, or 15 N/cm.

Any or all of the layers of the multi-layer article can be electrically conductive. Preferably, however, it is the innermost layer that is electrically conductive, where "innermost" refers to the layer designed to contact, for example, fuel or other liquid. The fluoroelastomer layer can be electrically conductive.

The multi-layer articles can be provided in a wide variety of shapes, including sheets, films, containers, hoses, tubes, and the like. When the multi-layer article is a hose, the first polymer layer can form an inner surface of the hose and the second polymer layer can form an outer surface of the hose. The articles are especially useful wherever chemical resistance and/or barrier properties are necessary. Examples of specific uses for the articles include their use in rigid and flexible retroreflective sheets, adhesive articles such as adhesive tapes, paint replacement films, drag reduction films, refrigerant hose, fuel line and filler neck hoses, hydraulic fluid hoses, exhaust handling hoses, fuel tanks, and the like. The articles are also useful in chemical handling and processing applications, and as wire and cable coatings or jackets.

Other features, objects, and advantages of the invention will be apparent from the description and drawings, and from the claims.

DETAILED DESCRIPTION

Figure 1:
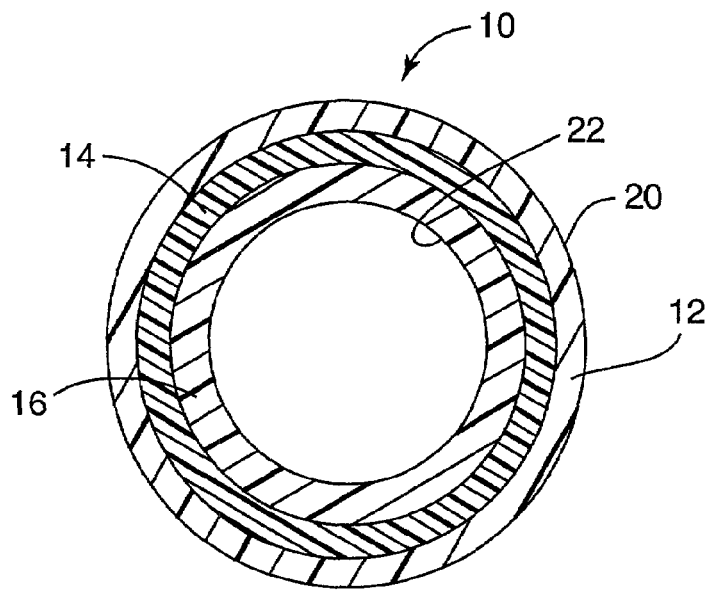
FIG. 1 is a cross-sectional view of a multi-layer article.

A multi-layer article can include a fluoroelastomer layer bonded on one surface to a barrier layer. The barrier layer is bonded to a non-fluorinated polymer layer. The multi-layer article can include other layers as well. For example, the laminate can include a polymer layer bonded to the fluoroelastomer layer on the face opposite the face to which the non-fluorinated polymer layer is bonded. This polymer layer can be a fluoropolymer or a non-fluorinated polymer.

The fluoropolymer can be a perfluorinated polymer or a partially fluorinated polymer. The fluoropolymer can also be either melt-processible such as in the case of a terpolymer of tetrafluoroethylene, hexafluoropropylene and vinylidene fluoride (THV), a tetrafluoroethylene-hexafluoropropylene copolymer (FEP), a ethylene-tetrafluoroethylene copolymer (ETFE), and other melt-processible fluoroplastics, or can be non-melt processible such as in the case of polytetrafluoroethylene (PTFE), modified PTFE copolymers, such as a copolymer of TFE and low levels of fluorinated vinyl ethers and fluoroelastomers. Also the melt-processible fluoroplastic can be a melt-processible PTFE as described, e.g. in Tervoot et al., *Macromolecules,* 33, 6460-6465 (2000).

Fluoroelastomers, before they are cured, can be processed by injection or compression molding or other methods normally associated with thermoplastics. After curing or crosslinking, fluoroelastomers generally are not able to be further processed. Fluoroelastomers can also be coated out of solvent in their uncross linked form. Fluoropolymers can also be coated from an aqueous dispersion form.

In preferred embodiments, the fluoroelastomer can be a perfluoroelastomer, a copolymer including tetrafluoroethylene, a copolymer including vinylidene fluoride, a copolymer including hexafluoropropylene, a copolymer including vinylidene fluoride and hexafluoropropylene, a copolymer including tetrafluoroethylene, vinylidene fluoride and hexafluoropropylene, or mixtures thereof.

The fluoropolymer can be a material that is capable of being extruded or solvent coated. Such fluoropolymers can be fluoroplastics that have melting temperatures ranging from about 100 to about 330° C., more preferably from about 150 to about 270° C. Fluoroplastics can include interpolymerized units derived from vinylidene fluoride (VDF) or tetrafluoroethylene (TFE), and can further include interpolymerized units derived from other fluorine-containing monomers, non-fluorine-containing monomers, or a combination thereof. Examples of suitable fluorine-containing monomers include tetrafluoroethylene (TFE), vinylidene fluoride (VDF), hexafluoropropylene (HFP), chlorotrifluoroethylene (CTFE), 3-chloropentafluoropropene, perfluorinated vinyl ethers (e.g., perfluoroalkoxy vinyl ethers such as $CF_3OCF_2CF_2CF_2OCF=CF_2$ and perfluoroalkyl vinyl ethers such as $CF_3OCF=CF_2$ and $CF_3CF_2CF_2OCF=CF_2$), and fluorine-containing di-olefins such as perfluorodiallyl ether and perfluoro-1,3-butadiene. Examples of suitable non-fluorine-containing monomers include olefin monomers such as ethylene, propylene, and the like.

The VDF-containing fluoropolymer can be prepared using emulsion polymerization techniques as described, e.g., in Sulzbach et al., U.S. Pat. No. 4,338,237 or Grootaert, U.S. Pat. No. 5,285,002, each of which is hereby incorporated by reference. Useful commercially available VDF-containing fluoroplastics include, for example, Dyneon™ THV 200, THV 400, THV 500G, THV 610X fluoropolymers (available from Dyneon LLC, St. Paul, Minn.), KYNAR™ 740 fluoropolymer (available from Atochem North America, Philadelphia, Pa.), and HYLAR™ 700 (available from Ausimont USA, Inc., Morristown, N.J.).

A useful fluoroelastomer includes interpolymerized units derived from at least HFP and VDF in which the amount of VDF is at least 10% by weight. The amount of VDF can range from 10-80% by weight, more preferably from 15-75% by weight. The amount of HFP can range from 10-80% by weight, more preferably from 15-75% by weight. Examples of suitable fluoroelastomers include VDF-HFP copolymers, VDF-HFP-TFE terpolymers, TFE-propylene copolymers, and the like. Useful commercially available fluoroelastomers include, for example, Dyneon™ FE-5830Q (FKM), FLS-2650 (FKM), BRE-7131X (FKM), AFLAS 150P (FKM), and FC-2178 (available from Dyneon LLC, St. Paul, Minn.).

The fluoroelastomer can be a curable fluoroelastomer. A curing agent can be blended with the curable elastomer to facilitate cure. Examples of useful curing agents include imidazolines, diamines, internal salts of diamines, thioureas, and polyphenol curing agents as discussed in U.S. Pat. No. 4,287,322 to Worm, incorporated herein by reference.

Examples of useful curing agents can include polyols in combination with organo-onium salts (e.g., organo-ammonium, organo-phosphonium, and organo-sulfonium salts). Examples are described, e.g., in Fukushi, U.S. Pat. No. 5,658,671, incorporated herein by reference. Diamines and peroxides can also be useful.

The fluoropolymers containing a halogen capable of participating in a peroxide cure reaction that can be included in the curable fluoroelastomer composition include well known fluoroelastomers. Typically, the halogen capable of participating in a peroxide cure reaction can be bromine, iodine or chlorine. The amounts of halogen included in the fluoroelastomer can be between 0.001 and 5%, or between 0.01 and 2.5%, by weight with respect to the total weight of the fluoroelastomer. The halogen capable of participating in a peroxide cure reaction can be present along the chain or in a terminal position. Examples of useful curable monomers include $CF_2=CFBr$, $CF_2=CHBr$, $CF_2=CFCF_2I$, $CH_2=CHCF_2CF_2Br$, $CF_2=CFCl$ and $CF_2=CFCF_2Cl$. See, for example, U.S. Pat. Nos. 4,745,165 and 4,214,060, each of which is incorporated herein by reference.

The non-fluorinated polymer typically has fewer than 10 mole percent of carbon-bonded fluorine atoms, preferably fewer than 2 mole percent, and more preferably fewer than 1 mole percent. The particular non-fluorinated polymer selected will depend upon the application or desired properties, such as chemical and/or flame resistance, of the multi-layer article. It can be a thermoplastic polymer, an elastomer, or a thermoplastic elastomer. The non-fluorinated polymer can be a polyamide, a polyolefin, a polyurethane, a polyester, a polyimide, a polyimide, a polystyrene, a polycarbonate, a polyketone, a polyurea, a polyacrylate, and a polymethylmethacrylate, or a mixture thereof. For example, the non-fluorinated polymer can be a non-fluorinated elastomer, such as acrylonitrile butadiene (NBR), hydrogenated acrylonitrile butadiene rubber (HNBR), butadiene rubber, chlorinated and chlorosulfonyl-polyethylene (CSM), copolymers of ethyl or other acrylates and ethylene (AEM), chloroprene, copolymers of ethylene and propylene (EPM) rubber, terpolymer of ethylene, propylene, and a diene (EPDM) rubber, ethylene oxide and chloromethyl oxirane (ECO) rubber, epichlorohydrin-ethylene oxide-allylglycidylether terpolymer (GECO), polyisobutylene, polyisoprene, polysulfide, polyurethane, silicone rubber, blends of polyvinyl chloride and NBR, styrene butadiene (SBR) rubber, ethylene-acrylate copolymer rubber, and ethylene-vinyl acetate rubber. Suitable ethylene-vinyl acetate copolymers include ELVAX™ available from E.I. DuPont de Nemours Co., Wilmington, Del.

Polyamides useful as the non-fluorinated polymer are generally commercially available. For example, polyamides such as any of the well-known nylons are available from a number of sources. Particularly preferred polyamides are nylon-6, nylon-6,6, nylon-11, and nylon-12. It should be noted that the selection of a particular polyamide material should be based upon the physical requirements of the particular application for the multi-layer article. For example, nylon-6 and nylon-6,6 offer better heat resistance properties than nylon-11 and nylon-12, whereas nylon-11 and nylon-12 offer better chemical resistance properties. In addition, other nylon materials such as nylon-6,12, nylon-6,9, nylon-4, nylon-4,2, nylon-4,6, nylon-7, and nylon-8 can be used, as well as ring-containing polyamides such as nylon-6,T and nylon-6,1. Suitable nylons include VESTAMID™ L2140, a nylon-12 available from Creanova, Inc. of Somerset, N.J. Polyether-containing polyamides, such as PEBAX™ polyamides (Atochem North America, Philadelphia, Pa.), can also be used.

Useful polyurethane polymers include aliphatic, cycloaliphatic, aromatic, and polycyclic polyurethanes. These polyurethanes are typically produced by reaction of a polyfunctional isocyanate with a polyol according to well-known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates can also be used. Useful polyols include polypentyleneadipate glycol, polytetramethylene ether glycol, polyethylene glycol, polycaprolactone diol, poly-1,2-butylene oxide glycol, and combinations thereof. Chain extenders such as butanediol or hexanediol can also be used in the reaction. Useful commercially available urethane polymers include MORTHANE™ L424.167, PN-04 or 3429 from Morton International, Seabrook, N.H. and X-4107 from B. F. Goodrich Co., Cleveland, Ohio.

Useful polyolefin polymers include homopolymers of ethylene, propylene, and the like, as well as copolymers of these monomers with, for example, acrylic monomers and other ethylenically unsaturated monomers such as vinyl acetate and higher alpha-olefins. Such polymers and copolymers can be prepared by conventional free radical polymerization or catalysis of such ethylenically unsaturated monomers. The degree of crystallinity of the polymer can vary. The polymer may, for example, be a semi-crystalline high density polyethylene or can be an elastomeric copolymer of ethylene and propylene. Carboxyl, anhydride, or imide functionalities can be incorporated into the polymer by polymerizing or copolymerizing functional monomers such as acrylic acid or maleic anhydride, or by modifying the polymer after polymerization, e.g., by grafting, by oxidation, or by forming ionomers. Examples include acid modified ethylene acrylate copolymers, anhydride modified ethylene vinyl acetate copolymers, anhydride modified polyethylene polymers, and anhydride modified polypropylene polymers. Such polymers and copolymers generally are commercially available. Commercially available polyolefins include, for example, ENGAGE™ (Dow-DuPont Elastomers, Wilmington, Del.) and EXACT™ (ExxonMobil, Linden, N.J.). Anhydride modified polyethylene polymers are commercially available, for example, from E.I. DuPont de Nemours & Co., Wilmington, Del. under the trade designation BYNEL™ co-extrudable adhesive resins, from Mitsui Chemicals America, Purchase, N.Y. under the trade designation Admer™ and from Uniroyal Chemical Company, Inc., Middlebury, Conn. under the trade designation Polybond™. Also anhydride modified ethylene propylene copolymer rubbers are commercially available, for example, from ExxonMobil, Linden, N.J. under the trade designation Exxelor™.

Useful polyacrylates and polymethacrylates include polymers of acrylic acid, methyl acrylate, ethyl acrylate, acrylamide, methacrylic acid, methyl methacrylate, ethyl methacrylate, and the like. An example of a polymethacrylate is EMAC™ (Chevron Chemical Co., Houston, Tex.).

Useful polyimide polymers include polyimide polymers made from the anhydride of pyromellitic acid and 4,4'-diaminodiphenyl ether available from E.I. DuPont de Nemours and Company under the tradename KAPTON™. Variations include KAPTON™ H, KAPTON™ E and KAPTON™ V, among others.

Additional examples of useful non-fluorinated polymers, as noted above, include polyesters, polycarbonates, polyketones, and polyureas. Useful polycarbonate polymers include aliphatic polycarbonates such as polyester carbonates, polyether carbonates, and bisphenol A-derived polycarbonates, and the like. Commercially available examples of such polymers include SELAR™ polyester (E.I. DuPont de Nemours & Co., Wilmington, Del.), LEXAN™ polycarbonate (General Electric, Pittsfield, Mass.), KADEL™ polyketone (Amoco, Chicago, Ill.), and SPECTRIM™ polyurea (Dow Chemical Co., Midland, Mich.).

Useful thermoplastic elastomers include thermoplastic elastomers made from an ethylene-propylene-diene terpolymer (EPDM) and a polypropylene. Commercially available thermoplastic elastomers include SANTOPRENE™ (Advanced Elastomer Systems of St. Louis, Mo.), KRAYTON™ (Shell Chemical Company of Houston, Tex.), SARLINK (Novacore Chemicals of Leominster, Mass.), or VICHEM (Vichem Corporation of Allendale, Mich.).

The non-fluorinated polymer can also be an elastomer. Examples of useful elastomers include acrylonitrile butadiene (NBR), butadiene rubber, chlorinated and chloro-sulfonated polyethylene, chloroprene, copolymers of ethylene and propylene (EPM) rubber, terpolymer of ethylene, propylene, and a diene (EPDM) rubber, ethylene oxide and chloromethyl oxirane (ECO) rubber, epichlorohydrin-ethylene oxide-allylglycidylether terpolymer (GECO), polyisobutylene, polyisoprene, polysulfide, polyurethane, silicone rubber, blends of polyvinyl chloride and NBR, styrene butadiene (SBR) rubber, ethylene-acrylate copolymer rubber, and ethylene-vinyl acetate rubber. Commercially available elastomers include NIPOL™ 1052 NBR (Zeon Chemical, Louisville, Ky.), HYDRIN™ C2000 epichlorohydrin-ethylene oxide rubber (Zeon Chemical, Louisville, Ky.), HYPALON™ 48 chlorosulfonated polyethylene rubber (E.I. DuPont de Nemours & Co., Wilmington, Del.), NORDEL™ EPDM (R. T. Vanderbilt Co., Inc., Norwalk, Conn.), VAMAC™ ethylene-acrylate elastomer (E.I. DuPont de Nemours & Co. Wilmington, Del.), KRYNAC™ NBR (Bayer Corp., Pittsburgh, Pa.), PERBUNAN™ NBR/PVC blend (Bayer Corp., Pittsburgh, Pa.), THERBAN™ hydrogenated NBR (Bayer Corp., Pittsburgh, Pa.), ZETPOL™ hydrogenated NBR (Zeon Chemical, Louisville, Ky.), and KELTAN™ EPDM (DSM Elastomers Americas, Addis, La.).

Any or all of the individual polymer layers in the multi-layer article can further include one or more additives. Examples of useful additives include pigments, plasticizers, tackifiers, fillers, electrically conductive materials (e.g., of the type described in U.S. Pat. No. 5,552,199, incorporated herein by reference), electrically insulating materials, stabilizers, antioxidants, lubricants, processing aids, impact modifiers, viscosity modifiers, or combinations thereof.

The barrier layer includes a polymer with a relatively low permeation constant to organic solvents. The barrier layer can include a polymer derived from vinyl acetate, such as an ethylene vinyl alcohol copolymer. Ethylene vinyl alcohol copolymer (EVOH) can be manufactured from a precursor polymer, such as ethylene vinyl acetate, which can be transesterified or saponifice in a methanolic solution of a basic catalyst such as sodium methoxide or sodium hydroxide. When the desired degree of conversion to ethylene vinyl alcohol polymer has been achieved, the catalyst can be neutralized by addition of a slight excess of an acid such as acetic acid, and the EVOH can be precipitated by mixing or contacting the reaction solution with water or a weak alcohol-water solution. The resulting material can be filtered from the slurry and purified of alcohol and salt by-products (e.g., sodium acetate) by washing with water acidified to a pH of 4-5 with certain weak aqueous acids in a final washing step before drying. The polymer can be an ethylene vinyl alcohol copolymer having an ethylene content of between 15 and 50 mol %, for example, between 20 and 40 mol %, or between 25 and 35 mol %. For example, the barrier layer can include an ethylene-vinyl alcohol copolymer such as EVAL® F101A (copolymer of ethylene and vinyl alcohol, 32 mol % ethylene content), available from Eval Company of America, Lisie, Ill.

The non-fluorinated polymer can include an adhesion promoter which improves the peel strength between the barrier layer and the non-fluorinated polymer. The adhesion promoter can be an anhydride, an imide, or acid functionalized polyolefin. The adhesion promoter can be a grafted polymer or a copolymer. For example, the adhesion promoter can be a maleinized polyolefin such as RICOBOND® 1731, a maleinized 1,2-polybutadiene, available from Sartomer, Exton, Pa.

The multi-layer article can be provided in a number of shapes and forms, including a tube, hose, sheet, molded article and the like. FIG. 1 depicts the article in the form of a tube or hose, for example, a hose suitable for use as a fuel or vapor line in an automobile fuel system. Referring to FIG. 1, there is shown a three-layer article 10 that includes a relatively thick outer layer 12 bonded to an intermediate layer 14, which is bonded to a thinner inner layer 16. Outer layer 12 can be the non-fluorinated polymer layer, as described above, and is designed to provide article 10 with structural integrity. Outer layer 12 forms outer surface 20 of the hose. The non-fluorinated polymer can include an elastomer (e.g., nitrile rubber, epichlorohydrin rubber, and the like), which can improve the sealing properties of the article when the hose or tube is attached to a rigid connector. Inner layer 16 can be a fluoroelastomer. Inner layer 16 forms inner surface 22 of the hose. Inner layer 16 can impart solvent or chemical resistance or thermal stability to the hose and can also improve the sealing properties of the article. Because of its solvent and permeation resistance and its ability to conform to surfaces, the fluoroelastomer can improve the sealing properties preventing leaking at the ends. The fluoroelastomer also can serve as a barrier or protective layer for the intermediate layer 14 protecting it from polar solvents such as alcohol and water and/or moisture, which can affect the barrier properties of the intermediate layer 14. Intermediate layer 14 can also be a barrier layer, which can decrease vapor or gas penetration through the wall of the hose when the hose is carrying, for example, a volatile organic solvent or automotive fuel. The combination of inner layer 16 and intermediate layer 14 minimizes the total amount of permeation from the hose and connections within a system. Some or all of the layers can include an additive to render them electrically conductive. To further enhance structural integrity, reinforcing aids such as fibers, mesh, braid, and/or a wire screen can be incorporated in article 10, e.g., as separate layers or as part of an existing layer.

The multi-layer article can be produced according to methods known in the art for manufacturing multi-layer articles in general. For example, the layer including the fluoroelastomer, the barrier layer, and the layer including the non-fluorinated polymer can be prepared in the form of thin films or sheets and then laminated together by application of heat, pressure, or combinations thereof to form a bonded multi-layer article. Alternatively, each of the layers can be co-extruded to form a multi-layer article. It is also possible to form one or more of the individual layers by extrusion coating, e.g., using a crosshead die. Another useful method for preparing the multi-layer article when the non-fluorinated polymer is an elastomer is described in U.S. application Ser. No. 09/644,731, filed Aug. 23, 2000, which is incorporated by reference in its entirety, in which a layered article is formed and heating of the layers is delayed until the material is heated under pressure, for example, in an autoclave.

The heat and pressure of the method by which the layers are brought together (e.g. extrusion or lamination) can be sufficient to provide adequate adhesion between the layers. It may, however, be desirable to further treat the resulting article, for example, with additional heat, pressure, or both, to enhance the bond strength between the layers. One way of supplying additional heat when the multi-layer article is prepared by extrusion is by delaying the cooling of the multi-layer article at the conclusion of the extrusion process. Alternatively, additional heat energy can be added to the multi-layer article by laminating or extruding the layers at a temperature higher than necessary for merely processing the components. As another alternative, the finished multi-layer article can be held at an elevated temperature for an extended period of time. For example, the finished article can be placed in a separate apparatus for elevating the temperature of the article such as an oven or heated liquid bath. Combinations of these methods can also be used.

Another way of increasing the bond strength between the layers is to treat the surface of one or more of the layers prior to forming the multi-layered article. Such surface treatments can include a solution treatment using a solvent. If the solvent contains a base, e.g., 1,8-diaza[5.4.0]bicycloundec-7-ene (DBU), treatment of the fluoropolymer can result in some degree of dehydrofluorination. Such dehydrofluorination is thought to be beneficial to promote adhesion to subsequently applied materials. This is particularly true when the subsequently applied material contains any agent that is reactive to sites of unsaturation.

Other examples of surface treatments include charged atmosphere treatments such as corona discharge treatment or plasma treatment. Electron beam treatment can also be useful.

Interlayer adhesion can also be enhanced using an agent such as an aliphatic di- or polyamine. The amine can be of any molecular weight that, when used, will result in an improvement in the adhesive bond strength between the layers of the multi-layer article. A particularly useful polyamine is polyallylamine having a molecular weight greater than about 1,000, as measured by gel permeation chromatography. An example of a useful commercially available polyamine is polyallyl amine having a molecular weight of about 3,000 available from Nitto Boseki Co., Ltd. The amine can be incorporated into one or more of the layers of the multi-layer article prior to forming the article using conventional means such as melt-mixing. Alternatively, the amine can be applied to a surface of one or more of the layers using conventional coating methods such as spray coating, curtain coating, immersion coating, dip coating, and the like.

The invention will now be described further by way of the following examples.

EXAMPLES

The following examples describe the preparation of various multi-layer articles. In the examples, the following ingredients were obtained from the indicated supplier: KRYNAC NV870 (NBR/PVC=70/30) and KRYNAC 34E50 (34% ACN content NBR) (commercially available from Bayer Corp., Pittsburgh, Pa.); zinc oxide USP-1 (commercially available from Zinc Corp. of America, Monaca, Pa.); stearic acid and dioctyl phosphate (DOP) (commercially available from Aldrich Chemical, Milwaukee, Wis.); DICUP 40C (dicumylperoxide) (commercially available from Hercules, Passaic, N.J.); RICOBOND 1731 (maleinized 1,2-polybutadiene) (commercially available from Sartomer, Exton, Pa., CAS No. 25655-35-0); ROYALENE 552 (EPDM) (commercially available from Crompton, Geismar, La.); SUPRMIX SUNPAR 2280 (paraffinic oil) (commercially available from Sun Company Inc., Cincinnati, Ohio; DYNEON FE-5830Q (FKM), DYNEON FLS-2650 (FKM), BRE-7131X (FKM), AFLAS 150P (FKM), and DYNEON FC-2178 (commercially available from Dyneon LLC, St. Paul, Minn.); Dai-el® G-902 (FKM) (commercially available from Daikin America Inc., Orangeburg, N.Y.); N-762 carbon black, N-774 carbon black and Vulcan XC-72 (conductive carbon black) (commercially available from Cabot Corp., Alpharetta, Ga.); N-990 (carbon black) (commercially available from Cancarb Limited, Medicine Hat, Alberta, Canada); calcium hydroxide HP (commercially available from C. P. Hall, Chicago, Ill.); magnesium oxide (commercially available from Morton International, Danvers, Mass., under the designation "ELASTOMAG™ 170");

calcium oxide HP (commercially available from C. P. Hall, Danvers, Mass.); dibutyl sebacate (DBS) (commercially available from Aldrich Chemical, Milwaukee, Wis.); triallyl isocyanurate (TAIC®) (commercially available from Mitsubishi International corp., New York, N.Y.); VAROX DBPH50 (45% 2,5-dimethyl-2,5-di(t-butylperoxy)hexane and 5% di-t-butyl peroxide) (commercially available from R. T. Vanderbilt Co., Norwalk, Conn.); VUL-CUP KE ($\alpha,\alpha'$-bis-(t-butyl peroxy) diisopropyl benzene) (commercially available from Hercules, Passaic, N.J.); and EVAL®F101A (copolymer of ethylene and vinyl alcohol, 32 mol % ethylene content) (commercially available from Eval Company of America, Lisie, Ill., CAS No. 25067-34-9).

Examples 1-9 and Comparative Examples
C-1 and C-2

Five non-fluorinated polymer compositions were prepared as follows. The compositions are set forth in Table 1 as Compositions 1-4, C1 and C2. Compositions 1-4, C1 and C2 were prepared using a two roll mill by compounding the polymer with the other ingredients in the proportions indicated in Table 1. Compositions 1-4, C1 and C2 and 4A were formed into 6 cm by 12 cm sheets about 1.5 mm thick by adjusting the gap of the roll mill.

TABLE 1

| | Composition | | | | | | |
|---|---|---|---|---|---|---|---|
| Ingredient | 1 | 2 | 3 | 4 | 4A | C1 | C2 |
| KRYNAC NV870 | 100 | 100 | 100 | | | 100 | |
| ROYALENE 552 | | | | 100 | | | 100 |
| KRYNAC 34E50 | | | | | 100 | | |
| N-762 | 60 | 60 | 60 | | | 60 | 60 |
| N-774 | | | | 80 | | | 80 |
| Zinc oxide USP-1 | 5 | 5 | 5 | 5 | 5 | 5 | 5 |
| Stearic acid | 1 | 1 | 1 | 1 | 1 | 1 | 1 |
| Dioctyl phosphate | 20 | 20 | 20 | | | 20 | |
| SUPRMIX SUNPAR 2280 | | | | 20 | | | 20 |
| Dicup 40C | 3.5 | 3.5 | 3.5 | 3.5 | 3.5 | 3.5 | 3.5 |
| RICOBOND 1731 | 5 | 10 | 20 | 10 | 10 | | |

All amounts are in parts per 100 rubber by weight (phr).

In Example 1, three 2.54 cm by 10 cm 0.1 mm thick strips of EVOH film (EVAL® F101A) were applied onto the sheet of Composition 1. Then the laminated sheet was heated under pressure press at 160° C. and 3.5 psi (24 kPa) for 30 minutes to form a multi-layer article. A 15.2 cm by 15.2 cm shim stock having a thickness of 1.25 mm was used to maintain the thickness of the laminate under the heat press. The sample was removed from the press and allowed to cool to room temperature. After cooling, the sample was cut into three 25.4 mm wide strips.

Peel or adhesion strength was measured on the three strips in accordance with ASTM D 1876 (T-peel test). To facilitate testing of the adhesion between the layers via a T-peel test, a sheet of 0.05 mm thick polyester (PET) was inserted about 2.54 cm between the EVOH film and the Composition along one edge of the sample before pressing. The PET sheet did not adhere to either material and was used only to create tabs of the laminate to insert into the jaws of a test device. An INSTRON® Model 1125 Tester, available from Istron Corp., set at a 100 mm/min crosshead speed, was used as the test device. As the layers were separated the peel strength of the middle 80% of the sample was measured. The values from the first 10% and the last 10% distance of the crosshead were omitted. The value reported was an average of three testing samples. When the bonding between samples broke at the material, the peak value was used instead of the average number.

In Example 2, the sample was prepared and tested as in Example 1 except Composition 2 was used instead of Composition 1. In Example 3, the sample was prepared and tested as in Example 1 except Composition 3 was used instead of Composition 1. In Comparative Example C1, a sample was prepared and tested as in Example 1 except Composition C1 was used instead of Composition 1. In Example 4, the sample was prepared and tested as in Example 1 except Composition 4 was used instead of Composition 1. In Comparative Example C2, a sample was prepared and tested as in Example 4 except Composition C2 was used instead of Composition 4.

The results of the adhesion test are summarized in Table 3. Substantially improved adhesion to elastomers can be obtained if an adhesion promoter, such as maleinized 1,2-polybutadiene, is added to a non-fluorinated polymer.

TABLE 3

| | | Bonding to EVOH | |
|---|---|---|---|
| Example | Polymer | Peel Strength (N/cm) | Failure Mode |
| 1 | KRYNAC NV870 | 1.7 | Interface |
| 2 | KRYNAC NV870 | 6.7 | Interface |
| 3 | KRYNAC NV870 | 33.8 | EVOH |
| 4 | ROYALENE 552 | 14.7 | EVOH |
| C1 | KRYNAC NV870 | 0.1 | Interface |
| C2 | ROYALENE 552 | 0.2 | Interface |

In Examples 5-9, the samples were prepared and tested as in Example 1, except Compositions 5-9, respectively, were used instead of Composition 1. In Comparative Example C3, a sample was prepared and tested with Composition C3. The compositions of Composition 5-9 and Composition C3 are summarized in Table 4. The adhesion test results are summarized in Table 5.

TABLE 4

| | Composition | | | | | |
|---|---|---|---|---|---|---|
| Ingredient | 5 | 6 | 7 | 8 | 9 | C3 |
| DYNEON FE-5830Q | 100 | | | | | |
| DYNEON FLS-2650 | | 100 | | | | |
| Dai-el ® G-902 | | | 100 | | | |
| BRE-7131X | | | | 100 | | |
| AFLAS 150P | | | | | 100 | |
| DYNEON FC-2178 | | | | | | 100 |
| N-990 | 12 | 30 | 30 | 30 | 25 | |
| Vulcan XC-72 | 10 | | | | | |
| Calcium hydroxide HP | 5 | 3 | 3 | 6 | | |
| ELASTOMAG™ 170 | 3 | | | | 3 | |
| Calcium oxide HP | 6 | | | | | |
| Dibutyl sebacate | 5 | | | | | |
| Triallyl isocyanurate | | 2.5 | 2.5 | | 5 | |
| VAROX DBPH50 | | 2.5 | 2.5 | | | |
| VUL-CUP KE | | | | | | 4 |

All amounts are in parts per 100 rubber by weight (phr).

TABLE 5

| | | Bonding to EVOH | |
|---|---|---|---|
| Example | Polymer | Peel Strength (N/cm) | Failure Mode |
| 5 | DYNEON FE-5830Q | 8.4 | Interface |
| 6 | DYNEON FLS-2650 | 28.7 | EVOH |
| 7 | Daiel G-902 | 29.4 | EVOH |
| 8 | BRE-7131X | 8.8 | Interface |

TABLE 5-continued

| | | Bonding to EVOH | |
|---|---|---|---|
| Example | Polymer | Peel Strength (N/cm) | Failure Mode |
| 9 | AFLAS 150P | 38.7 | EVOH |
| C3 | DYNEON FC-2178 | 1.0 | Interface |

Example 10

In Example 10, a 15 cm by 15 cm 0.1 mm thick film of EVOH (EVAL® F101A) was sandwiched between a 1.2 mm thick non-fluorinated polymer rubber sheet of Composition 4A and a 1.2 mm thick fluoroelastomer sheet of Composition 6. Then the laminated sheet was heated in a pressure press at 160° C. and 3.5 psi (24 kPa) for 30 minutes. A 15.2 cm by 15.2 cm shim stock having a thickness of 2.0 mm was used to maintain the thickness of the laminate under the heat press. The sample was removed from the press and allowed to cool to room temperature. The resulting sample was cut into three 25.4 mm wide strips.

Peel or adhesion strength was measured on the three strips in accordance with ASTM D1876 (T-peel test). To facilitate testing of the adhesion between the layers via a T-peel test, a sheet of 0.05 mm thick polyester (PET) was inserted about 2.54 cm between the EVOH film and each of the Composition sheets along one edge of the laminate sample before pressing. The PET sheet did not adhere to either material and was used only to create tabs of the laminate to insert into the jaws of a test device. An INSTRON® Model 1125 Tester, available from Instron Corp., set at 100 mm/min crosshead speed was used as the test device. As the layers were separated the peel strength of the middle 80% of the sample was measured. The values from the first 10% and the last 10% of the distance of the crosshead were omitted. The value reported was the average of three testing samples. When the bonding between samples broke at the material, the peak value was used instead of the average number. The results of testing the bond strength of each of the layers bonded to the EVOH are shown in Table 6.

TABLE 6

| | | Bonding to EVOH | |
|---|---|---|---|
| Example | Layer | Peel strength (N/cm) | Failure mode |
| 10 | Nitrile rubber/EVOH | 6.9 | Interface |
| 10 | Fluoroelastomer/EVOH | 25.4 | Fluoroelastomer |

Example 11 and Comparative Example C4

In Example 11, a 15 cm by 15 cm 0.015 mm thick film of EVOH (EVAL® F101A) was applied to a 1.2 mm thick fluoroelastomer sheet of Composition 5. Then the laminated sheet was heated under pressure in a press at 160° C. and 3.5 psi (24 kPa) for 30 minutes. A 15.2 cm by 15.2 cm shim stock having a thickness of 1.0 mm was used to maintain the thickness of the laminate under the heat press. The sample was removed from the press and allowed to cool to room temperature.

In Comparative Example C4, a sample was prepared and tested as in Example 11 except the EVOH film was not included. This sample was only the fluoroelastomer sheet.

Figure 2:
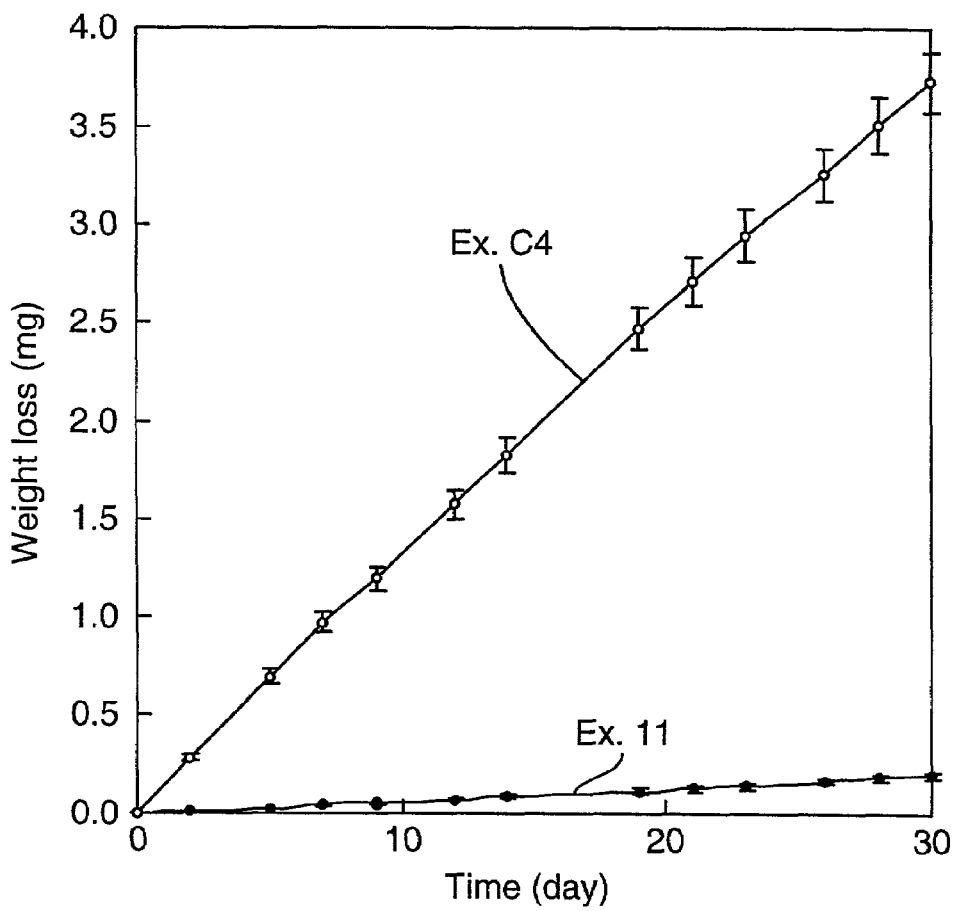
FIG. 2 is a graph depicting the rate of permeation of fuel through a multi-layer article including a barrier layer and a multi-layer article that does not include the barrier layer.

The sheets for Example 11 and Comparative Example C4 were each cut into a disc having a diameter of 7.72 cm and used for permeation testing. Permeation constants were obtained using the procedure described in ASTM D 814-86 (Reapproved 1991) with the following changes or specifics: The glass jar of ASTM D 814 was replaced with a Thwing-Albert Vapometer Permeability Cup as described in ASTM E 96-95; the fluoroelastomer side of the test specimen was oriented toward the test liquid; the gaskets used were made of DYNEON FE-5840Q elastomer (Shore A hardness of about 60) instead of neoprene rubber and were located on both the top and bottom of the test specimen; a circular disk of mesh screen was used on top of the gasket to prevent the test specimen from deforming during the test; the test liquid was 100 mL of CE 10 fuel (10% ethanol, 45% iso-octane; 45% toluene); and the test temperature was 40° C. The permeation constant (g.mm/m$^2$.day) was calculated by measuring the weight loss for a 30-day period using Mettler AT 400 at an accuracy of 0.1 mg. The averaged cumulative weight losses (milligrams) of two samples with deviation bar versus time (days) were plotted in FIG. 2. The slope of the line obtained by the least squares fit of weight loss (grams) versus time (days) was divided by the area of the test specimen and multiplied by its thickness. The permeation results are summarized in Table 7.

The surface resistivity of this sheet sample (fluoroelastomer side) was also measured and determined according to ASTM D257 to be 5×10$^5$ ohm/square using resistance meter model 872A, available from Electro-tech System Inc., before cutting into the testing samples.

TABLE 7

| Example | Material | Permeation constant (g · mm/m$^2$ · day) |
|---|---|---|
| 11 | EVOH/fluoroelastomer | 1.6 |
| C4 | Fluoroelastomer | 33.0 |

A number of embodiments have been described. Nevertheless, it will be understood that various modifications can be made without departing from the spirit and scope of the description. Accordingly, other embodiments are within the scope of the following claims.

What is claimed is:

1. A multi-layer article comprising:
   a first polymer layer comprising a fluoroelastomer;
   a barrier layer bonded to a surface of the first polymer layer; and
   a second polymer layer bonded to the barrier layer, the second polymer layer comprising a non-fluorinated polymer and an adhesion promoter;
   wherein, for a fluid in contact with the article, the barrier layer has a permeation constant that is lower than the permeation constant for the first and second polymer layers.

2. The multi-layer article of claim 1, wherein the fluoroelastomer is a copolymer including tetrafluoroethylene.

3. The multi-layer article of claim 1, wherein the fluoroelastomer is a copolymer including vinylidene fluoride.

4. The multi-layer article of claim 1, wherein the fluoroelastomer is a copolymer including hexafluoropropylene.

5. The multi-layer article of claim 1, wherein the fluoroelastomer is a copolymer including chlorotrifluoroethylene.

6. The multi-layer article of claim 1, wherein the fluoroelastomer further comprises interpolymerized units derived from a vinyl ether monomer selected from the group consisting of perfluorinated alkoxy vinyl ether monomers, perfluorinated alkyl vinyl ether monomers, and combinations thereof.

7. The multi-layer article of claim 1, wherein the barrier layer includes a polymer derived from vinyl acetate.

8. The multi-layer article of claim 6, wherein the polymer derived from vinyl acetate is an ethylene vinyl alcohol copolymer.

9. The multi-layer article of claim 1, wherein the barrier layer includes an ethylene vinyl alcohol copolymer.

10. The multi-layer article of claim 1, wherein the non-fluorinated polymer comprises an elastomer.

11. The multi-layer article of claim 1, wherein the non-fluorinated polymer comprises a thermoplastic polymer.

12. The multi-layer article of claim 1, wherein the non-fluorinated polymer comprises a thermoplastic elastomer.

13. The multi-layer article of claim 1, wherein the non-fluorinated polymer is selected from the group consisting of nitrile rubbers, ethylene-propylene-diene monomer rubbers, epichlorohydrin rubbers, ethylene-acrylate copolymer rubbers, polyamides, polyurethanes, polyolefins, and combinations thereof.

14. The multi-layer article of claim 1, wherein the adhesion promoter comprises a maleinized polyolefin.

15. The multi-layer article of claim 1, wherein the peel strength between the first polymer layer and the barrier layer is at least 5 N/cm.

16. The multi-layer article of claim 1, wherein the peel strength between the barrier layer and the second polymer layer is at least 15 N/cm.

17. The multi-layer article of claim 1, wherein the article is a hose.

18. The multi-layer article of claim 17, wherein the first polymer layer forms an inner surface of the hose and the second polymer layer forms an outer surface of the hose.

19. A multi-layer article comprising:
   a first polymer layer comprising a fluoroelastomer including vinylidene fluoride and hexafluoropropylene;
   a barrier layer bonded to a surface of the first polymer layer, the barrier layer including a polymer derived from vinyl acetate; and
   a second polymer layer bonded to the barrier layer, the second polymer layer comprising a non-fluorinated polymer and an adhesion promoter;
   wherein, for a fluid in contact with the article, the barrier layer has a permeation constant that is lower than the permeation constant for the first and second polymer layers.

20. The multi-layer article of claim 19, wherein the fluoroelastomer further comprises interpolymerized units derived from a vinyl ether monomer selected from the group consisting of perfluorinated alkoxy vinyl ether monomers, perfluorinated alkyl vinyl ether monomers, and combinations thereof.

21. The multi-layer article of claim 19, wherein the polymer derived from vinyl acetate is an ethylene vinyl alcohol copolymer.

22. The multi-layer article of claim 19, wherein the non-fluorinated polymer comprises an elastomer.

23. The multi-layer article of claim 19, wherein the non-fluorinated polymer is selected from the group consisting of nitrile rubbers, ethylene-propylene-diene monomer rubbers, epichlorohydrin rubbers, ethylene-acrylate copolymer rubbers polyamides, polyurethanes, polyolefins, and combinations thereof.

24. The multi-layer article of claim 19, wherein the adhesion promoter comprises a maleinized polyolefin.

25. The multi-layer article of claim 19, wherein the peel strength between the first polymer layer and the barrier layer is at least 5 N/cm.

26. The multi-layer article of claim 19, wherein the peel strength between the barrier layer and the second polymer layer is at least 15 N/cm.

27. The multi-layer article of claim 19, wherein the article is a hose.

28. The multi-layer article of claim 27, wherein the first polymer layer forms an inner surface of the hose and the second polymer layer forms an outer surface of the hose.

* * * * *

UNITED STATES PATENT AND TRADEMARK OFFICE
CERTIFICATE OF CORRECTION

| | | |
|---|---|---|
| PATENT NO. | : 7,291,369 B2 | Page 1 of 1 |
| APPLICATION NO. | : 09/970522 | |
| DATED | : November 6, 2007 | |
| INVENTOR(S) | : Tatsuo Fukushi | |

It is certified that error appears in the above-identified patent and that said Letters Patent is hereby corrected as shown below:

Column 14
Line 65, in Claim 23, delete "epichiorohydrin" and insert in place thereof
-- epichlorohydrin --.

Signed and Sealed this

Sixth Day of May, 2008

JON W. DUDAS
*Director of the United States Patent and Trademark Office*